United States Patent [19]

Silverberg et al.

[11] Patent Number: 4,734,716

[45] Date of Patent: Mar. 29, 1988

[54] PLOTTER AND ALIGNING METHOD

[75] Inventors: Eric Silverberg; James A. Parnell, both of Austin; Marvin L. Freeman, Round Rock; Robert A. Johnson, Georgetown, all of Tex.

[73] Assignee: Ametek, Inc., Austin, Tex.

[21] Appl. No.: 925,067

[22] Filed: Oct. 30, 1986

[51] Int. Cl.$^4$ .................................. G01D 15/24
[52] U.S. Cl. ...................... 346/136; 346/1.1; 271/228
[58] Field of Search .............. 346/1.1, 24, 134, 136; 271/227, 228, 246

[56] References Cited

U.S. PATENT DOCUMENTS

| | | | |
|---|---|---|---|
| Re. 31,684 | 9/1984 | Yeiser | 346/68 |
| 3,925,786 | 12/1975 | Haas | 346/24 |
| 4,216,482 | 8/1980 | Mason | 346/134 X |
| 4,384,298 | 5/1983 | LaBarre et al. | 346/134 X |
| 4,598,298 | 7/1986 | Groenke et al. | 346/1.1 |

Primary Examiner—A. D. Pellinen
Assistant Examiner—Derek S. Jennings
Attorney, Agent, or Firm—Amster, Rothstein & Ebenstein

[57] ABSTRACT

A plotter having the capability of unattended operation incorporates several innovations. An X-axis dual motor drive mechanism moves the plotting chart through the plotter using two independently controlled motors driving respective individual friction drives at either side of the chart. An automatic chart alignment mechanism aligns the chart with the plotter X-axis using the X-axis dual motor drive for swiveling of the chart as necessary and a sensor to detect and correct the position of the chart. A chart cutting mechanism allows chart stock supplied in roll form to be cut to a desired length for a plot using a knife assembly carried by the pen carriage like a pen. A cut chart handling mechanism enables cut charts to be retrieved and neatly stored.

41 Claims, 10 Drawing Figures

PLOTTER AND ALIGNING METHOD

BACKGROUND OF THE INVENTION

The present invention relates to plotters generally and, more particularly, to a plotter having features enabling unattended operation thereof and to a method for automatically aligning a chart with the plotter X-axis.

Plotters convert digital information into graphic representation by using a chart and pen to produce line drawings from a series of individual points. The Cartesian coordinate system used to determine the position of these points consists of three orthogonal or mutually perpendicular axes known as X, Y, Z, the relationship of these axis to a typical plotter being shown in FIG. 2. These digital points are typically transmitted by a host computer, where they are created and stored.

In a moving-medium type plotter, both the pen and chart are moved to produce a drawing. With this type of plotter, movement in the X-axis is accomplished by moving the chart in and out of the plotter, conventionally with a single drive drum and motor assembly. Y-axis movement is accomplished by moving the pen back and forth across the chart, conventionally with a drive belt and motor assembly. Z-axis movement is simply accomplished by moving the pen up off the chart or down onto the chart, conventionally by means of a solenoid. With these basic movements, the plotter is capable of producing virtually any kind of line drawing on the chart.

In an era of ever increasing labor costs, the desirability of a truly automatic plotter—that is, a plotter having a reliable capability of unattended operation—requires no elucidation. Preferably, such an automatic plotter would be able to accommodate either cut sheet or roll chart format, accommodate chart widths of a variety of standard drafting sizes, and be inexpensive to manufacture. The creation of such an automatic chart plotter requires the confluence of a number of different innovative features. For example, the conventional X-axis drive uses a single motor to drive a large rod or drum with sprockets or friction drive surfaces to move the chart along the X-axis. Even the slight normal manufacturing tolerance differences over the length of the single rod or drum can result in a substantial unintended skewing of the plot. Thus, very long plots on roll-feed media have heretofore been possible only with the more expensive sprocketed drive mechanism and chart, and not the relatively inexpensive friction drive mechanism. Furthermore, as the single large rod or drum necessarily spans the full width of the plotter, in larger plotters the inertial load for the drive system has necessitated the use of an expensive large motor. Thus, as a first innovative feature, the truly automatic plotter requires an improved inexpensive, non-skewing X-axis friction drive mechanism. Second, an automatic plotter requires means for automatically aligning the chart with the plotter axes, especially the X-axis, during loading procedures and optionally at subsequent times. Ideally, the automatic chart alignment means used during the loading procedure cooperates with the improved X-axis motor drive so that the chart is properly positioned in alignment with the plotter axes during the loading procedure and not accidentally caused to skew therefrom subsequently by the X-axis motor drive. Third, in order to enable the automatic plotter to utilize chart stock supplied in roll form and to cut this stock to a desired length for a given plot, the automatic plotter must have a chart cutting mechanism. In order to keep the cost of the automatic plotter competitive with conventional plotters, this feature should be implemented utilizing as much as possible of the existing plotter equipment. Finally, an automatic plotter must include a cut chart handling mechanism for handling (that is, retrieving and neatly and orderly storing) cut charts of varying length, as produced by the chart cutting mechanism.

Accordingly, it is an object of the present invention to provide a plotter having an X-axis drive which avoids accidental skewing of the chart.

Another object is to provide such a plotter having an X-axis drive offering a low inertial load relative to the conventional X-axis drive.

A further object is to provide a plotter having an automatic chart alignment feature so that it can accurately align a chart with the plotter X-axis.

It is another object of the present invention to provide a plotter having a chart cutting feature which, for only a slight additional cost, enables chart stock supplied in roll form to be accurately cut to a desired length for a plot.

It is also an object to provide a plotter having a cut chart handling feature enabling the retrieval and orderly storing of cut charts.

It is a further object to provide a plotter having the capablity of unattended operation through utilization of an improved X-axis drive mechanism, an automatic chart alignment mechanism, a chart cutting mechanism and a cut chart handling mechanism.

SUMMARY OF THE INVENTION

It has now been found that the above and related objects of the present invention are obtained in a plotter apparatus having an improved X-axis drive and automatic chart aligning, chart cutting and cut chart handling features. The plotter apparatus is adapted to receive a signal and comprises generally a frame, means for transporting a sheet through the frame along a first axis, and means for marking the sheet moving through the frame in accordance with the signal received.

The improved X-axis drive mechanism utilizes as transporting means a pair of friction drives adapted to be disposed adjacent a first surface of the sheet adjacent respective opposed sides thereof. Each of a pair of means for driving the friction drives under independent control is adapted to drive its respective friction drive at an independent rate.

In a preferred embodiment, the friction drives have aligned axes of rotation substantially transverse to the axis of transport of the sheet. Each of the friction drives is driven at a remote end by an associated one of the friction drives, there also being means secured to the frame for freely rotatably supporting the proximate ends of the friction drives (preferably, a single common support means for both proximate ends). The drive means are independently controlled to compensate for variations in the effective diameters of the friction drives, so that the pair of drive means are adapted to drive the friction drives under independent control so as to control skewing of the sheet by the friction drives. More particularly, the pair of drive means is adapted to cause controlled skewing and unskewing of the sheet. Bearing means, adapted to be disposed adjacent a second surface of the sheet opposite said first surface and adjacent respective opposed sides thereof, engage the sheet and force the sheet into engagement with the pair of friction drives. The bearing means preferably comprises a substantially spaced pair of bearing members.

The automatic chart alignment mechanism comprises a system for aligning a sheet being transported through the frame with a first linear side of the sheet parallel to the first axis of the frame. The mechanism utilizes as the transporting means a horizontally spaced pair of sheet transport means adapted to be disposed adjacent opposite sides of the sheet for independently transporting the sheet sides both forwardly and rearwardly. The transporting means operates in two basic modes: in the first mode, both transport means transport the sheet sides in the same direction at the same rate to transport the sheet forwardly or rearwardly; in the second mode, a first one of the transport means transports the first side of the sheet at a differential rate than a second one of the transport means transports the second side of the sheet (either forwardly or rearwardly) to swivel the sheet. Further provided are means spaced a given distance from the first transport means for sensing the first side of the sheet, and means for aligning the first side of the sheet with the sensing means. This aligning means comprises in turn means for swiveling a first point on the first side of the sheet across the sensing means to locate the first side and align it substantially at the first point with the sensing means, means for advancing the sheet the given distance, and means for swiveling a second point on the first side of the sheet across the sensing means to locate the first side and align it substantially at the second point with the sensing means, the first and second point being spaced apart the given distance. Preferably, the first transport means is spaced the given distance from the first point when the first point is swiveled. The first transport means either retains a point on the first side stationary while the second transport means transports the second side to swivel the sheet about the point or transports it at a non-zero rate less than the second transport means transports the second side of the sheet to swivel the sheet. The swiveling means preferably swivels the first point back and forth across the sensing means.

In a preferred embodiment providing enhanced accuracy of alignment, especially for long sheets, the sensing means is spaced a first given distance $X_1$ from the first transport means, and the means for advancing the sheet from the first point A to the second point B advances the sheet the first given distance $X_1$. The aligning means further comprises means for aligning by use of the sensing means two points A and B narrowly spaced from each other by the distance $X_1$ along the first side of the sheet, means for then aligning by use of the sensing means a fourth point D widely spaced from point B by the distance $X_2$ along the first side of the sheet, and means for finally aligning by computation and without use of the sensing means a third point C intermediate points B and D and narrowly spaced from point D by the distance $X_1$ along the first side the sheet.

A preferred embodiment of the means for aligning the first side of the sheet with the sensing means comprises means for advancing the sheet (after its substantial alignment at the second point B with the sensing means) a second given distance $X_2$ substantially greater than the first given distance $X_1$, and means for then swiveling a fourth point D on the first side of the sheet back and forth across the sensing means to locate the first side and align it substantially at the fourth point D with the sensing means by a net movement R of the second transport means. The aligning means further comprises means for advancing the sheet the first given distance $X_1$, and means to swivel the third point C toward the sensing means by a net movement R' of the second transport means where $R' = (R \times X_2)/(X_1 + X_2)$. It will be appreciated that the first and second, second and third, and third and fourth points A and B, B and C, and C and D are spaced apart in the same direction the distance $X_1$, $X_2 - X_1$ and $X_1$, respectively, The first and second points A and B are preferably on opposite ends of a sheet (or contemplated plot) from the third and fourth points C and D. The first and third points A and C are held stationary by the first transport means as the second transport means swivels the second and fourth points B and D, respectively, across the sensing means, and the fourth point D is held stationary by the first transport means as the second transport means swivels the third point C towards the sensing means. Alternatively, the first transport means transports the first, third and fourth points A, C and D at a non-zero rate less than the second transport means transports the second side of the sheet to swivel the sheet. Preferably the sheet transport means comprises a rotatable friction drive and the movements R and R' are rotational movement. It will be appreciated that whereas the alignment with the sensing means of points A, B and D are based on physical determinations by the sensing means, the alignment of point C with the sensing means is determined mathematically.

The chart cutting feature is found in plotter apparatus wherein the marking means comprises a marker holder for holding a marker (such as a pen), storage means (such as a carousel) for holding a plurality of markers, means for causing the holder to receive a selected marker from and to return it to the storage means, and means for moving the holder and any marker held thereby along a second axis of the sheet substantially perpendicular to the first axis and along a third axis substantially perpendicular to the sheet. The chart cutting mechanism comprises a knife means for cutting the sheet along the second axis, the knife means being configured and dimensioned to be received, held and returned by the holder and held by the storage means as a marker.

In a preferred embodiment, the moving means comprises means for first moving the holder to position the knife means in the sheet to one side of the central segment of the sheet and then moving the holder outwardly along the second axis until it clears the sheet, means for next moving the holder to position the knife means in the sheet to the other side of the central segment of the sheet and then moving the holder outwardly along the second axis until it clears the sheet, and means for finally moving the holder along the second axis to cause the knife means to cut across the central segment. Alternatively, the moving means comprises means for moving the holder to cause the knife means to cut through the width of the sheet in a series of moves commencing centrally in the sheet and terminating beyond the edge of the sheet. The storage means and the holder preferably contain means to fix the orientation of the knife means relative thereto.

The chart handling feature comprises means for collecting the segments cut from the sheet for storage. The collecting means comprises a bar member extending over at least the width of the sheet and movable in order among an initial retracted position wherein the bar member is disposed adjacent the back surface of the sheet being transported and allows unimpeded fall of the sheet, an intermediate extended position wherein the bar member is disposed adjacent a front surface of the sheet being transported and allows unimpeded fall of the sheet, and a final retracted position wherein the bar member supports the segment of the sheet just transported after it has been cut.

In a preferred embodiment, the collecting means includes spring members secured to the frame and adapted to bear on the segments supported by the bar member, and the bar member in the final retracted position grasps the front surface of the segment at substantially the mid-point thereof. The apparatus preferably additionally comprises means for moving the bar member from the initial retracted position to the intermediate extended position prior to transport of the segment of the sheet to the level of the bar member, and means for moving the bar member from the intermediate extended position to the final retracted position when approximately half of the segment of the sheet has passed the level of the bar member.

The plotter apparatus of the present invention having the capability of unattended operation comprises independently driven dual X-axis friction drives for transporting a sheet through the plotter, means for automatically aligning a sheet with the X-axis of the plotter, means for automatically cutting a sheet into segments along the Y-axis of the plotter, and means for automatically collecting and storing the segments.

BRIEF DESCRIPTION OF THE DRAWING

The above brief description, as well as further objects and features of the present invention, will be more fully understood by reference to the following detailed description of the presently preferred, albeit illustrative, embodiments of the present invention, when taken in conjunction with the accompanying drawing wherein.

DETAILED DESCRIPTION OF THE PREFERRED EMBODIMENTS

Figure 1:
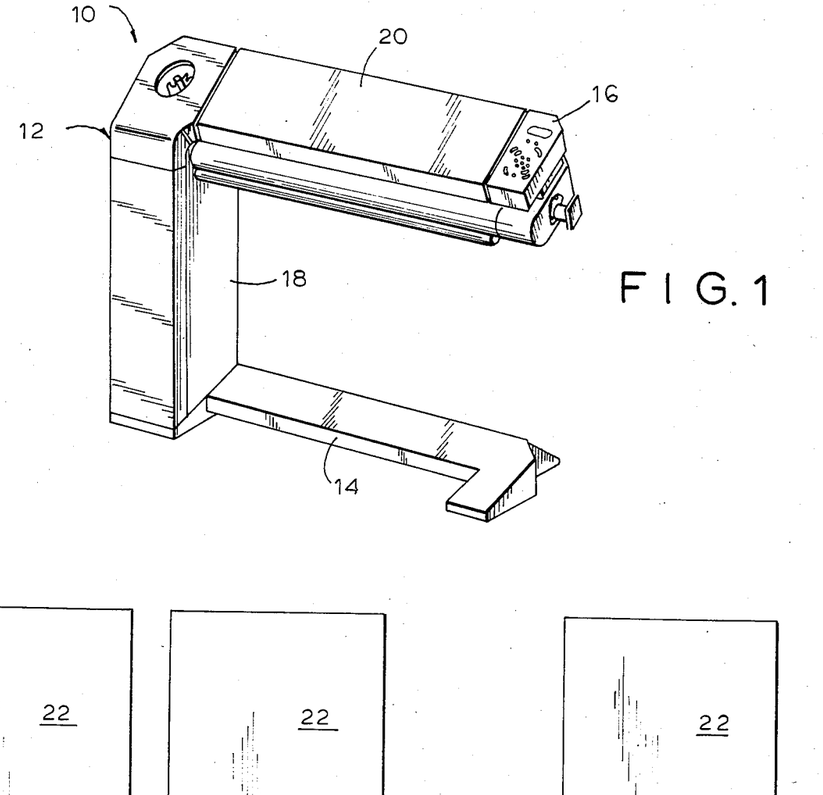
FIG. 1 is an isometric view of a plotter according to the present invention.

Referring now to the drawing, and in particular FIG. 1 thereof, therein illustrated in a plotter according to the present invention, designated generally by the reference numeral 10. The frame, generally designated 12, includes an elongated stable base 14, a generally parallel elongated upper member 16, and an upright side member 18 connecting the base 14 and upper member 16. The upper member 16 includes a pivotable cover 20 which is pivotable between a closed position, as illustrated in FIG. 1, and a raised position, as illustrated in FIG. 2, which enables access to many of the working components of the plotter.

Figure 2:
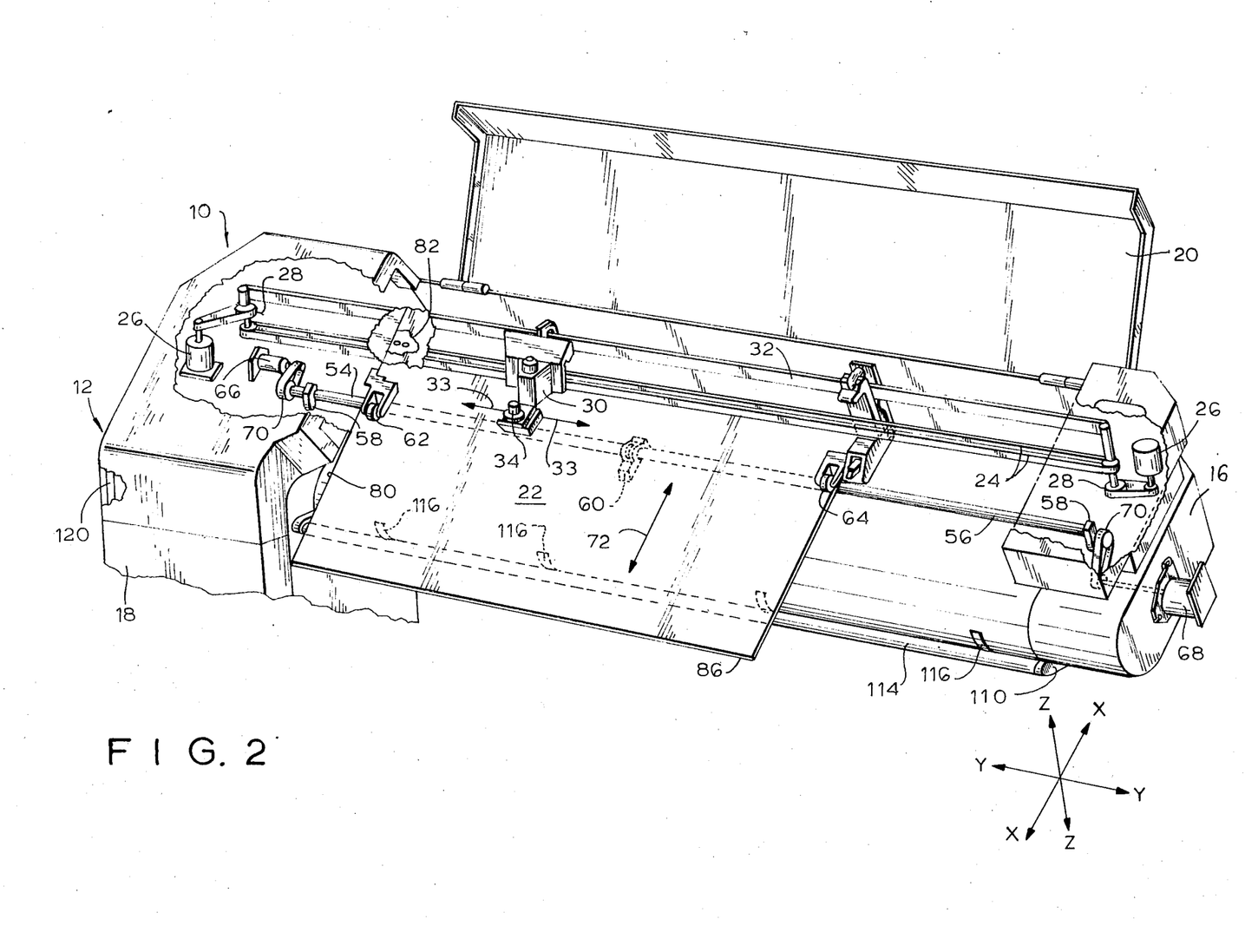
FIG. 2 is a fragmentary isometric view, to an enlarged scale, of the plotter of FIG. 1, with the top cover thereof open, the collecting bar in its initial retracted position, and portions of the upper surface cut away to reveal details of internal construction.

Referring now to FIG. 2, therein illustrated is the upper portion of the plotter 10, with the pivotable cover 20 in its raised or open position so as to reveal internal details of construction of the plotter. The axes X, Y and Z of the plotter are indicated by the orthogonal representation of axes below the plotter. Means for marking the sheet or chart 22 along the Y-axis, as it passes along the X-axis through the frame 12, in accordance with the signal received by the control mechanism, includes a Y-axis dual motor drive system. The system utilizes a drive belt 24 having each end thereof driven by a separate Y-axis motor 26 functionally connected thereto by a belt and pulley arrangement 28. A conventional pen carriage or marker holder 30 is slidably mounted on the horizontally extending support 32 and secured to the belt 24 for movement therewith. Both Y-axis motor 26 are driven together as a unit to produce Y-axis travel of the drive belt 24 and pen carriage 30 (as shown by arrows 33). The use of a dual motor drive system provides superior compliance of the drive belt relative to a single motor drive system, thus resulting in greater speed, accuracy and repeatability in positioning of the pen carriage.

Figure 8:
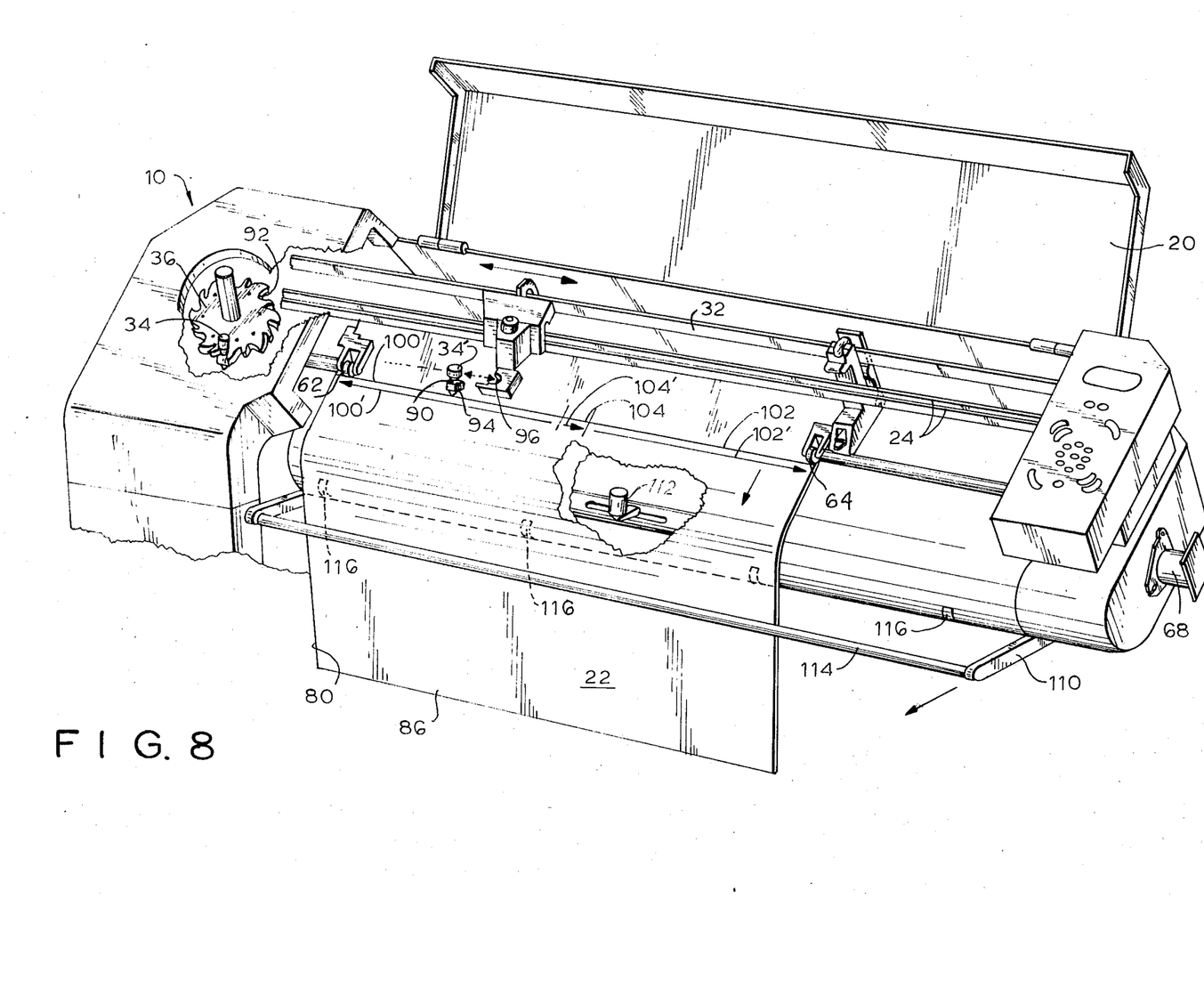
FIG. 8 is a view similar to FIG. 2, but showing the collecting bar in its intermediate extended position and the cutter making the first cut.

The pen carriage 30 is adapted to hold a special pen or marker 34 which plots points on the upper surface of sheet 22. The pen carriage, under appropriate direction from the control mechanism, is capable of either lowering the pen 34 so that it is in contact with the upper surface of sheet 22 so as to produce markings thereon or lifting the pen in the opposite direction along the Z-axis to remove the pen from the upper surface of the sheet so that it cannot produce markings thereon. Referring now to FIG. 8 as well, the Y-axis dual motors are adapted to drive the belt 24 so as to bring the pen carriage 30 all the way to the left until it is adjacent the pen carousel or storage means 36. The pen carousel 36 is equipped with a variety of pens 34 and, by coordinated activity of the pen carriage 30 and the pen carousel 36, a pen 34 currently carried by the pen carousel may be exchanged for another pen presently carried by the pen carousel. This enables a pen to be replaced when its ink supply becomes exhausted or when a pen of different color is to be employed, etc.

X-AXIS DUAL MOTOR DRIVE

Referring now to FIG. 2, the means for transporting a sheet or chart 22 through the frame 12 along the X-axis comprises a pair of axially aligned friction drives or rollers 54, 56 disposed adjacent the undersurface of the sheet adjacent respective opposed sides thereof. Each of the friction drives 54, 56 comprises a single small diameter rod having an outer end journaled in an outer bearing block assembly 58 and an inner end journaled in a common center bearing block assembly 60. A pair of bearing means 62, 64 are disposed adjacent the upper surface of the sheet 22 adjacent respective opposed sides thereof to engage the sheet and force it into engagement with the associated friction drives 54, 56. The left bearing means 62 is preferably a conventional fixed pinch roller, and the right bearing means 64 is preferably a conventional adjustable pinch roller slidable along horizontally extending support 32. A pair of X-axis motors 66, 68 drive the friction drives 54, 56 under independent control—that is, with each variable speed drive motor 66, 68 being adapted to drive its respective friction drive 54, 56 at an independent rate of rotation. The motors 66, 68 are connected to the end portions of the drive shafts 54, 56 extending outwardly from the outer bearing block assemblies 58 by means of belt and pulley arrangements 70. It will be appreciated that the outer bearing block assemblies 58 and the center bearing block assembly 60 cooperate to maintain the friction drives with their axes of rotation aligned with each other along the Y-axis and substantially transverse to the axis of transport of the sheet—namely, the X-axis.

The X-axis dual motor drive provides three features or advantages when compared to a conventional system. First, in large plotters, the inertial load of the drive system is greatly reduced because the motors only need to rotate a small friction drive instead of a single large rod or drum that spans the maximum form width in a conventional plotter. The two small motors are more economical than one large one. Second, slight, but normal manufacturing tolerance differences between the diameters of the two friction drives can be compensated for by varying the relative rotational speeds thereof. For example, a 0.001 inch difference of diameter between drive rollers of 2 inches circumference results in an error of 0.05 inch after a move of 34 inches. This means that normally one side of the normal E-size chart will be 0.05 inch further forward than the other side, thereby resulting in skewing of the plot. Such differences in diameter can be measured and compensated for in the present invention by scaling the drive movement commands generated by the electronic control circuitry driving the motors. In principle, this permits very long plots on roll-feed media previously possible only for sprocketed drive mechanisms and media. Third, the X-axis dual motor drive permits the chart to be moved in a linear direction (indicated by arrow 72) when both drives are rotated in the same direction at the same effective speed (after compensation for drive diameter differentials), or in a rotational motion if the drives are driven differentially. Thus, this feature enables controlled skewing of the sheet by rotating of the drives at different effective speeds in the same direction, by rotating the drives at the same effective speed in different directions, or by rotating one drive and immobilizing the other. This enables an automatic chart alignment feature, as will be described next.

AUTOMATIC CHART ALIGNMENT

The automatic chart alignment system enables a sheet 22 with a first linear side 80 to be aligned parallel to the X-axis by means of the aforementioned X-axis dual drive system and an electronic sensor 82 mounted on the frame 12 and capable of detecting the presence of the sheet 22 passing thereover. This sensor 82 is mounted a fixed distance $X_1$ rearwardly from the drive rods 54, 56 in a location along the plotter X-axis corresponding to the desired position of the chart edge. As the chart moves in a linear motion if the drives 54, 56 are driven in the same direction at the same effective speed and in a rotational motion if the drives are driven differentially, the sheet 22 can be correctly aligned with the plotter's Y-axis by just a few simple movements and use of sensor 82.

Figure 3:
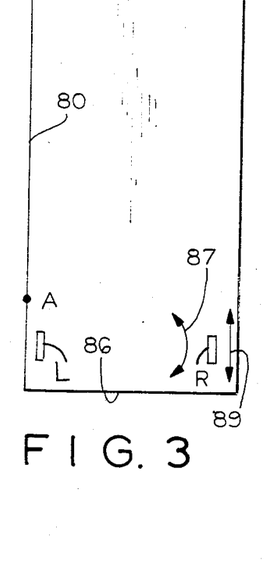
FIG. 3 is a schematic of a chart being aligned with a sensor at point A.

Referring now to FIG. 3, the chart 22 is shown as viewed from the top of the plotter downwardly. The left and right drive rods 54, 56 are indicated schematically by the rectangles L and R, respectively. The chart 22 is initially loaded so that its left linear edge 80 is presumably not aligned with the plotter's X-axis. The left and right drive rods L and R may be run backward equally, if necessary to bring the front end 86 of the chart 22 a short distance in front of the drive rollers L and R. The means for aligning the first side of the sheet with the sensor 82 then swivels a first point A on the left edge 80 of the sheet 22 back and forth across the sensor (as indicated by arrow 87) to locate the edge 80 and align it substantially at the first point A with the sensor 82. More particularly, this is accomplished by immobilizing drive L (and thus the sheet edge segment between drive L and the fixed pinch roll 62) and running drive R first backward and then forward to cover and then uncover the sensor at point A. The left edge of the chart 22 at point A is now aligned with the sensor. (It will be appreciated that a cover and uncover operation is always performed any time an edge is being detected to maintain optimum accuracy since the sensor may have different trigger states for rising and falling edges.)

Figure 4:
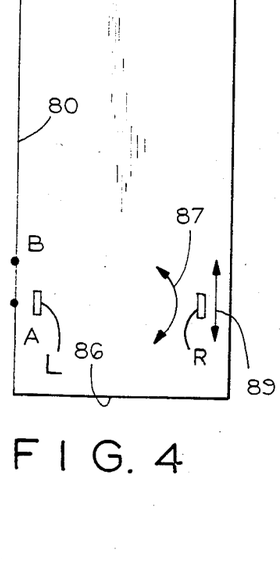
FIG. 4 is a schematic of the chart of FIG. 3 being aligned with the sensor at point B.

Referring now to FIG. 4, the aligning means then advances the sheet 22 a given distance $X_1$ by rotating both drives L and R equally forward (as indicated by arrow 89), thereby bringing point A against drive L. The aligning means then retains stationary the first point A while swiveling a second point B on the left side 80 of the sheet 22 back and forth across the sensor 82 to locate the left side and align it substantially at the second point B with the sensor. This is accomplished by immobilizing drive L and running drive R backward and forward to cover and uncover the sensor at point B. (Point A pivots between fixed pinch roll 62 and drive L, the pinch roll locking the location of point A against the immobilized drive L.).

Figure 5:
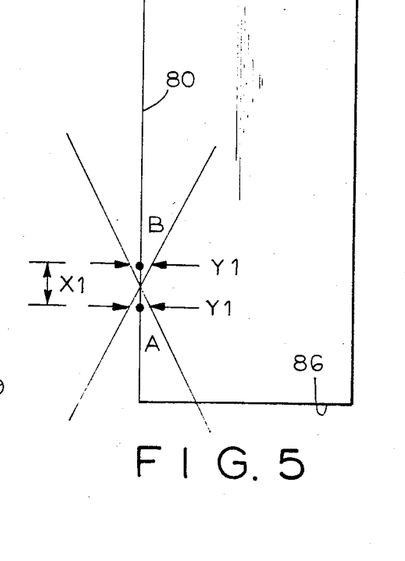
FIG. 5 is a schematic of the chart of FIG. 4 aligned at points A and B.

Referring now to FIG. 5, as the first and second points A and B on the left edge of the chart 22 are spaced apart the given distance $X_1$, the left edge is presumably aligned with the X-axis of the plotter with an accuracy which is a reflection of the separation $X_1$ between points A and B. If the repeatability of the sensor is designated $Y_1$, the error in parallelism is derived by the formula $(Y_1+Y_1)/X_1$.

Figures 6, 7:
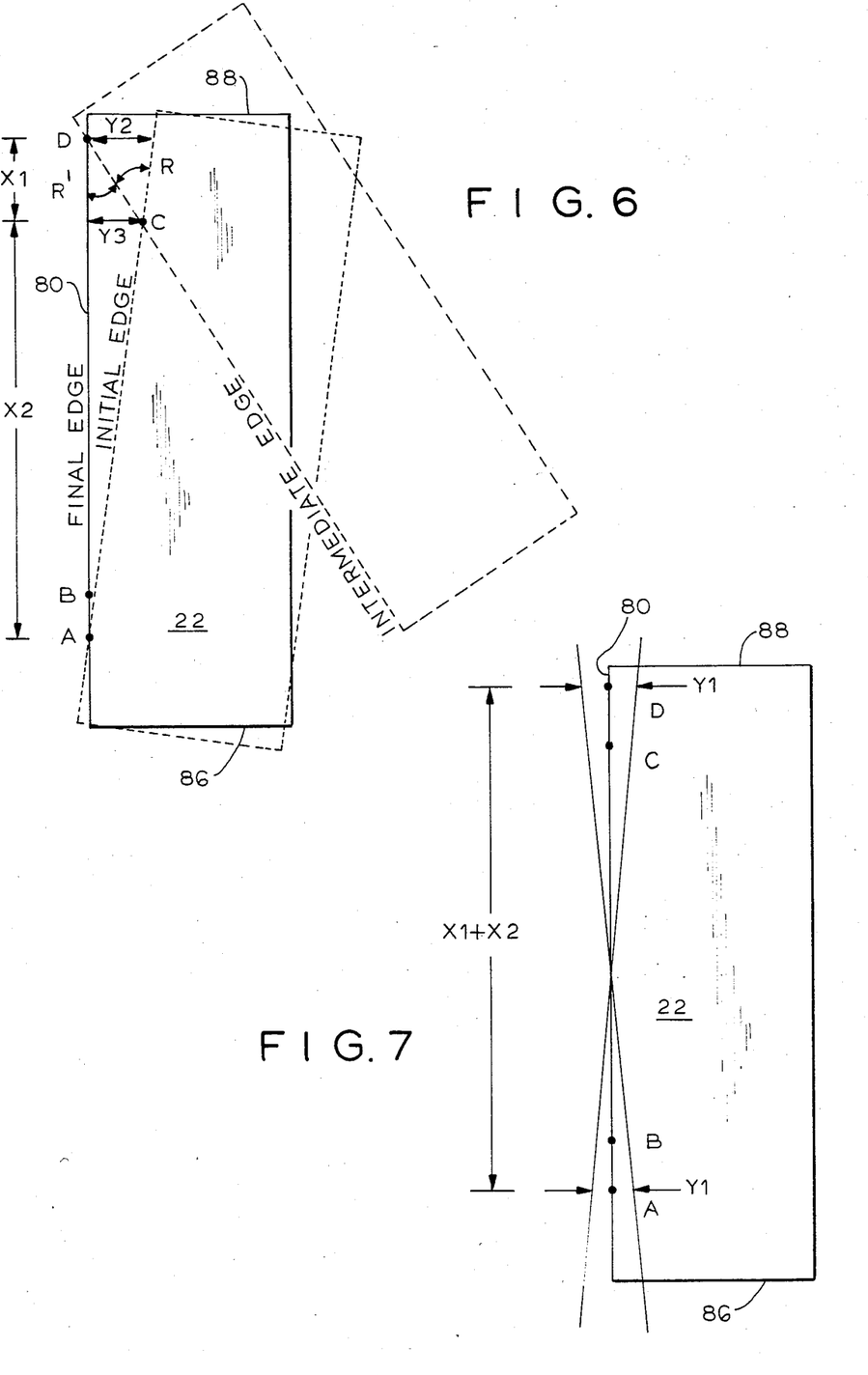
FIG. 6 is a schematic of the chart of FIG. 5 being further aligned at points C and D.
FIG. 7 is a schematic of the chart of FIG. 6 aligned at points A, B, C and D.

Referring now to FIG. 6 as well, additional parallelism accuracy can be obtained, as may be necessitated for a long chart, by now going to the back or trailing edge 88 of the chart 22 and performing an alignment correction there. To this end, the aligning means additionally comprises means for advancing the sheet a second given distance $X_2$ substantially greater than the first given distance $X_1$. This is accomplished by running both drives L and R equally forward until a third point C on the left edge 80 of sheet 22 is against drive L (the distance between first and third points A and C being $X_2$) and a fourth point D on the left edge 80 of sheet 22 is by the sensor 82 (the distance between third and fourth points C and D being $X_1$), points C and D typically being disposed near the back edge of the chart 22. During this move, any small parallelism error noted over the distance $X_1$ between points A and B is translated into a larger error $Y_2$ in the region of point D. Left edge 80 of chart 22 is now in the "initial edge" position shown in dashed line in FIG. 6.

The aligning means then retains stationary the third point C on the left side 80 of the sheet 22 while swiveling the fourth point D on the left side of the sheet back and forth across the sensor 82 to locate the left side and align it substantially at the fourth point D with the sensor. To accomplsih this drive L is immobilized and drive R is run backward and forward to cover and uncover the sensor at point D (by rotating the chart about immobilized pivot point C). This correlates with moving point D toward the sensor the distance $Y_2$ and brings the left edge 80 to the "intermediate edge" position shown in dashed line in FIG. 6. The net angular rotation of drive R required to accomplish this is designated the movement R. The aligning means then advances the sheet the first given distance $X_1$ by driving both drives L and R equally forward the first given distance $X_1$ until the fourth point D is against drive L. The aligning means then swivels the third point C towards the sensor by a net movement R' of the right transport means where $R'=(R\times X_2)/(S_1+X_2)$. This is accomplished by now immobilizing the drive L (so that point D becomes the pivot point), while drive R rotates the chart by the distance R', which correlates with moving point C by the distance $Y_3$. Now the chart is aligned with the left side in the "final edge" position shown in solid line.

As can be seen in FIG. 6, $Y_3/X_2=Y_2/(X_1+X_2)$ or $Y_3=Y_2\times X_2/(X_1+X_2)$. The value R' is therefore calculated as $-(R\times X_2)/(X_1+X_2)$. This minus sign indicates that the direction is reversed so that if the movement R was a backward movement of drive R (a counter clockwise chart rotation as shown in FIG. 3), the movement R' will be a forward movement of drive R (a clockwise chart rotation as shwon in FIG. 3). The sign simply insures that the rotation of drive R is such as to move point C closer to the X-axis passing through the sensor. Referring now to FIG. 7, the final parallelism accuracy can be expressed as $(Y_1+Y_1)/(X_1+X_2)$, obviously an improvement over $(Y_1+Y_1)/X_1$.

Chart alignment can be performed as part of chart loading procedures to insure proper orientation before a plot, during a plot to insure the accuracy of the plot, or, when using a continuous roll of media, between plots to insure proper alignment for each plot.

The last mentioned procedure can be modified to start at the back of the chart with points A and B and go to the front of the chart with points C and D, as might be useful after spooling a chart forward off a roll and after loading of a chart from the front of the plotter.

The alignment procedures encompass swiveling a sheet 22 by any differential driving of the two X-axis drive motors 66 and 68.. One drive (i.e., drive L on the same sheet side as sensor 82) may be immobilized or held stationary, as described above in connection with the alignment procedures wherein it is driven at a zero rate, or it may be driven forward or backward at a positive or non-zero rate which is significantly less than the rate at which the other drive (i.e. drive R on the far side of the sheet from sensor 82) is driven. The latter has proven particularly useful in reducing the abrasion of the sheet surface during the alignment procedure.

Typically the sensor 82 will include a pair of sensing means, one for detecting swiveling of the left edge 80 of sheet 22 and one for detecting passage of the front end 86 or rear end 88 of the sheet 22.

CHART CUTTING MECHANISM

Referring now to FIG. 8, th chart cutting mechanism utilizes a knife 34' for cutting the sheet 22 along the Y-axis, the knife being configured and dimensioned to be received, held and returned by the pen holder or carriage 30 and held by the pen carousel or storage means 36 as a pen or marker 34. The knife 34' is similar to a standard plotter pen and is normally stored in the pen carousel with the pens when not in use. In FIG. 8, to better illustrate the knife 34', it is shown separate from the carriage 30, but connected thereto by a dashed line arrow. When cutting is desired, the pen carriage 30 retrieves the knife 34' from the pen carousel 36, typically leaving the pen 34 in the pen carousel. To insure that the knife remains parallel with the motion of the pen carriage along the Y-axis during cutting operations, the knife is provided with opposed grooves, one groove 90 mating with a key 92 in the pen carousel 36 and one groove 94 mating with a key 96 in the pen carriage 30. Preferably, the blade of the knife extends a little further downwardly from the pen carriage to insure that the blade penetrates the sheet when the pen carriage is in its down orientation. Alternatively, however, the knife may be the same length as a pen and the control mechanism may simply lower the pen carriage further along the Z-axis when cutting is desired.

A chart cutting operation is initiated by bringing the pen carriage close to the pen carousel and returning any pen in the pen carriage to its appropriate slot in the pen carousel. The pen carousel is then rotated until the knife is in appropriate position for the pen carriage, and the pen carriage then retrieves the knife. Once the chart is advanced to the cutting position, with the knife up, the pen carriage moves to the approximate center of the chart. The pen carriage is then lowered until the knife penetrates the chart, then the pen carriage is moved left through the edge of the paper, thereby making the first cut 100. The pen carriage is then raised and moved just past the approximate center of the chart. At this point, the pen carriage is again lowered until the knife penetrates the chart, then the pen carriage is moved right through the edge of the chart, thereby making the second cut 102. At this point, the chart is now supported only by the small tab of remaining material at the center of the chart. The pen carriage is then raised again and moved to the tab at the center of the chart. The pen carriage is then lowered until the knife penetrates the plane of the chart, and the pen carriage is then moved right (or left) so as to cut the remaining tab, thereby making the third cut 104. The directions of the various cuts are indicated by the arrows 100', 102' and 104'. In effect then, the chart cutting mechanism first positions the knife in the chart to one side of a central segment of the chart and then moves it outwardly until it clears the sheet, next positions the knife in the sheet to the other side of the central segment of the chart and then moves it outwardly until it clears the sheet, and finally causes the knife to cut across the central segment. After the third cut, the chart is then free to drop into the chart handling mechanism while the pen carriage returns the knife to the pen carousel and retrieves a pen, thereby completing the cutting operation and returning the plotter to its previous state.

It will be appreciated that while the chart cutting mechanism preferably uses three cutting motions—a first edge cut 100, a second edge cut 102, and a third center cut 104—to insure that the chart drops smoothly and accurately into the chart handling mechanism after cutting, obviously a different number of cutting motions may be used. Another preferred cutting pattern comprises a series of only two cuts, both outwardly in opposite directions from a center point of the chart.

As the chart cutting mechanism employs only the standard plotter elements, with the standard pen holder modified to carry a knife, implementation of this feature is very economical.

CUT CHART HANDLING MECHANISM

Figure 9:
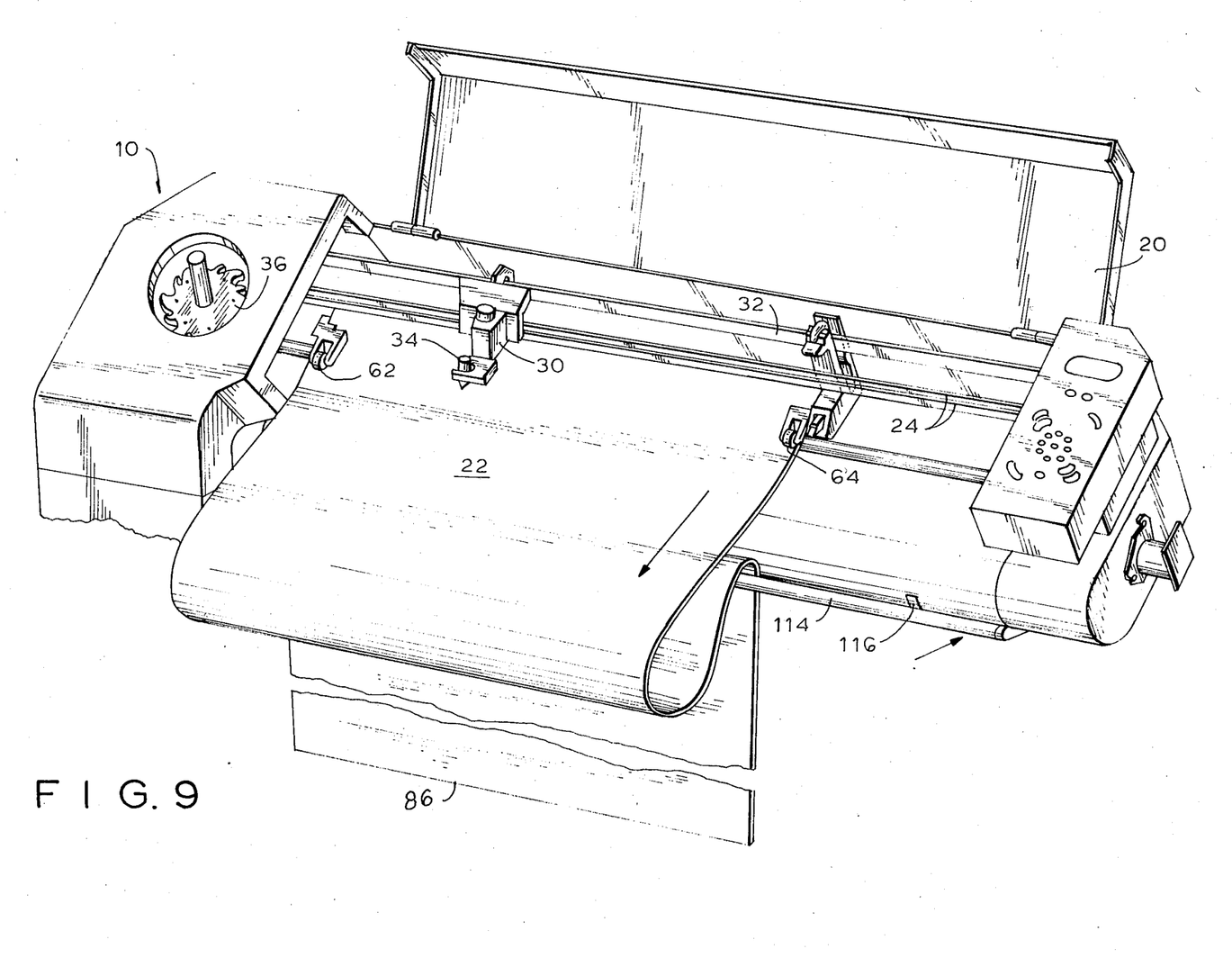
FIG. 9 is a view similar to FIG. 8, but showing the collecting bar in its final retracted position.
Figure 10:
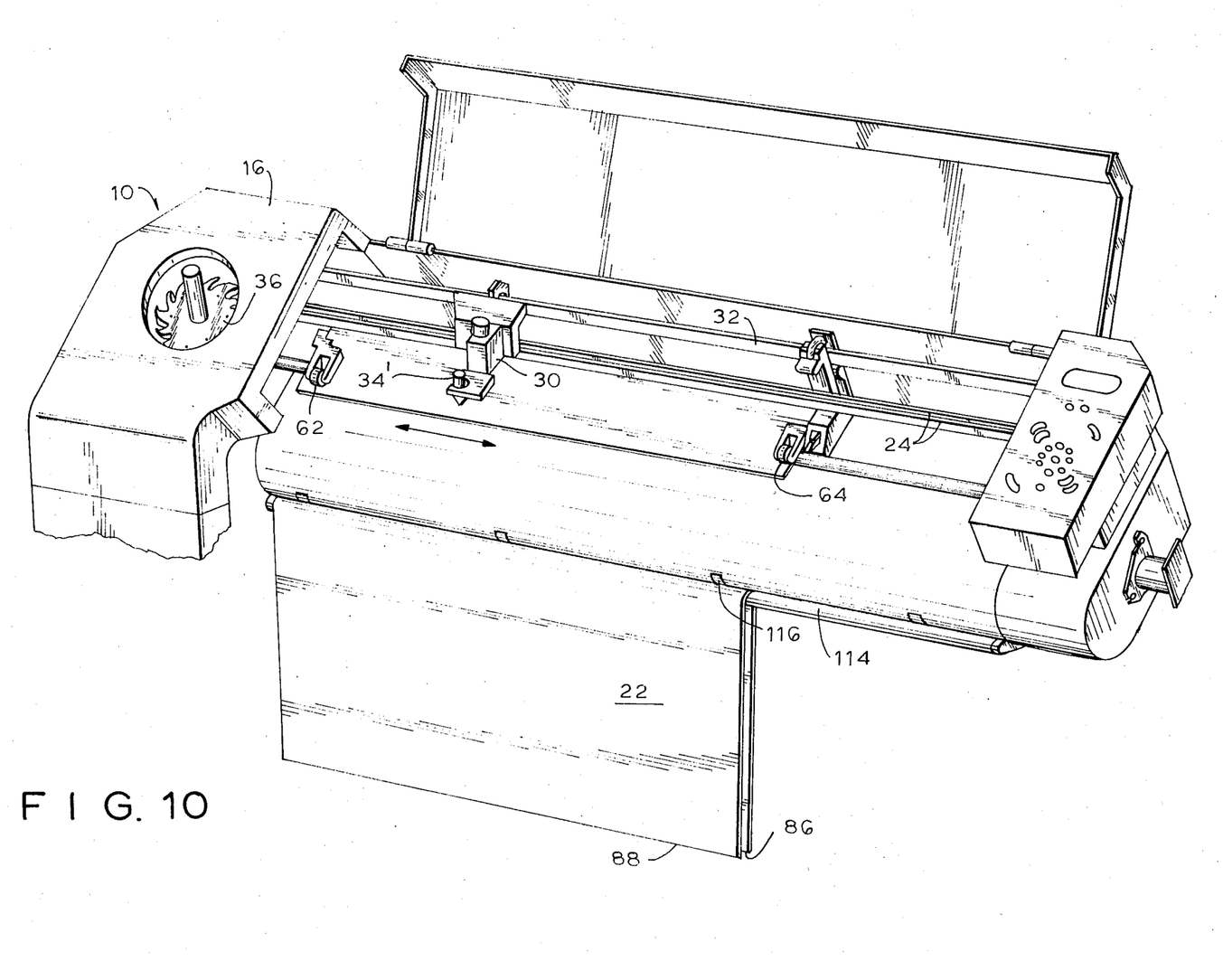
FIG. 10 is a view similar to FIG. 9, but showing the paper segment cut and supported by the collecting bar.

Referring now to FIGS. 8-10, the cut chart handling mechanism is a rod and frame assembly 110 that can be extended and retracted from beneath the horizontal upper member 16 with a drive motor 112, this degree of movement being all that is required to retrieve and store a cut chart. The cut chart handling mechanism stores a given number of charts for a plotting system by successfully draping them over the rod, from which the charts can then be unloaded by the operator. Operation of the cut chart handling mechanism is, of course, synchronized with the other plotter operations, especially chart advance and chart cutting.

More particularly, the drive motor 112 initially moves the collecting rod or bar member 114 from its initial retracted position (as shown in FIGS. 1 and 2), wherein the bar member is disposed adjacent a back surface of the chart being transported and allows unimpeded fall of the front end 86 of the chart, to an intermediate extended position (as shown in FIG. 8), wherein the bar member is extended fully forward adjacent a front surface of the chart being transported, still allowing unimpeded fall of the chart. The bar member remains in the intermediate extended position until approximately half the chart length extends out the front of the plotter, behind and below the bar member. The motor 112 then moves the bar member from the intermediate extended position to its final retracted position (as shown in FIGS. 9 and 10), wherein the bar member clamps the mid-length transverse axis of the chart against the spring fingers 116 disposed under the front edge of the upper member 16. As the chart then advances, the remaining plot length falls in front of the bar member (as shown in FIG. 9). Once the chart 22 is cut by the chart cutting mechanism, the rear end 88 of the cut chart falls over in front of the bar member (as shown in FIG. 10), thereby to orderly and neatly store the plot on the bar member until the operator removes it. In subsequent cycles the stored plot will be moved with the bar member. The position of the bar member is naturally the same in both the initial and final retracted positions.

The various actions of the plotter are coordinated by a central control mechanism, typically a microprocessor or microchip 120 contained in the upper member 16. The control mechanism controls action of the plotter along the plotter X, Y and Z axes. More particularly, the control mechanism compensates for variations in the effective diameters of the X-axis drive rollers and coordinates the activities thereof to produce the desires X-axes motion, whether that be a linear forward or backward motion or a swiveling of the sheet about a point by immobilization of one drive (thereby fixing the swivel point between the immobilized drive and the pinch roller) and backward and forward motion of the other drive. On its control of motion along the Y-axis, the control mechanism interprets the signal received by the plotter and accordingly coordinates the direction and extent of the motion of the Y-axis motors and hence the pen carriage. To this end, the control mechanism further controls rotation of the pen carousel or storage means to provide pen or knife means to the pen carriage. In its control of motion along the Z-axis, the control mechanism effects energization or de-energization of the solenoids which control the up and down orientation of the pen carriage, as necessary for marking and cutting.

To summarize, the present invention provides several mechanisms useful in both attended and unattended operation of the plotter. The X-axis drive mechanism not only avoids accidental skewing of the chart, but due to a low inertial load presented by the dual drives, is economically implemented. The automatic chart alignment mechanism requires only an edge aligning sensor and the aforementioned X-axis dual drive mechanism to enable charts to be accurately aligned with the plotter X-axis. The chart cutting mechanism requires generally only the modification of a marker to carry a knife in order to enable chart stock supplied in roll form to be accurately cut to a desired length for a plot. The cut chart handling mechanism, provided at only a moderate extra cost, enables the retrieval and orderly storing of cut charts.

It will be appreciated that while various features of the present invention may be utilized independently of each other (with the possible exception of the automatic alignment mechanism which requires an X-axis dual drive mechanism enabling swiveling of the chart), a special feature of the present invention is a plotter incorporating all of these mechanisms so that charts may be fed without accidental skewing through the plotter, aligned, cut and stored without human intervention.

Now that the preferred embodiments of the present invention have been shown and described in detail, various modifications and improvements thereon will become readily apparent to those skilled in the art. Accordingly, the spirit and scope of the present invention is to be limited only by the appended claims, and not by the foregoing specification.

What is claimed is:

1. In plotter apparatus adapted to receive a signal comprising a frame, means for transporting a sheet through said frame along a first axis, and means for marking the sheet moving through said frame in accordance with the signal received, the improvement wherein said transporting means comprises:
   (a) a pair of friction drives adapted to be disposed adjacent a first surface of the sheet adjacent respective opposed sides thereof; and
   (b) a pair of means for driving said friction drives under independent control, each said drive means being adapted to drive its respective friction drive at an independent rate.

2. The apparatus of claim 1, wherein said friction drives have aligned axes of rotation substantially transverse to the axis of transport of the sheet.

3. The apparatus of claim 2 wherein each of said friction drives is driven at a remote end by an associated one of said drive means, and additionally comprising means for freely rotatably supporting the proximate ends of said friction drives.

4. The apparatus of claim 3 wherein a common supporting means secured to said frame supports both proximate ends of said friction drives.

5. The apparatus of claim 2 wherein said pair of friction drives extends essentially the width of said sheet.

6. The apparatus of claim 1 wherein said drive means are independently controlled to compensate for variations in the effective diameters of said friction drives.

7. The apparatus of claim 1 wherein said pair of drive means is adapted to drive said friction drives under independent control so as to control skewing of the sheet by said friction drives.

8. The apparatus of claim 1 wherein said pair of drive means is adapted to cause controlled skewing and unskewing of the sheet.

9. The apparatus of claim 1 additionally comprising bearing means, adapted to be disposed adjacent a second surface of the sheet opposite said first surface and adjacent respective opposed sides thereof, to engage the sheet and force the sheet into engagement with said pair of friction drives.

10. The apparatus of claim 1 wherein said bearing means comprises a substantially spaced pair of bearing members.

11. In plotter apparatus adapted to receive a signal comprising a frame, means for transporting a sheet through said frame along a first axis, and means for marking the sheet moving through said frame in accordance with the signal received, the improvement comprising a system for aligning a sheet with a first linear side parallel to the first axis comprising:
(a) as said transporting means, a horizontally spaced pair of sheet transport means adapted to be disposed adjacent opposite sides of the sheet for independently transporting the sheet sides both forwardly and rearwardly, both with both of said transport means transporting the sheet in the same direction at the same rate to transport the sheet forwardly or rearwardly and with a first one of said transport means transporting the first side of the sheet at a lesser rate than a second one of said transport means transports the second side of the sheet to swivel the sheet;
(b) means spaced a given distance from said first transport means for sensing the first side of the sheet; and
(c) means for aligning the first side of the sheet with said sensing means comprising
  (i) means for swiveling a first point on the first side of the sheet across said sensing means to locate the first side and align it substantially at the first point with said sensing means;
  (ii) means for advancing the sheet the given distance; and
  (iii) means for swiveling a second point on the first side of the sheet across said sensing means to locate the first side and align it substantially at the second point with said sensing means, said first and second points being spaced apart the given distance.

12. The apparatus of claim 11 wherein the first point is spaced the given distance from said first transport means when the first point is swiveled.

13. The apparatus of claim 11 wherein said first transport means retains a point on the first side stationary while said second transport means transports the second side to swivel the sheet about the point.

14. The apparatus of claim 11 wherein said first transport means transports the first side of the sheet at a non-zero rate less than said second transport means transports the second side of the sheet to swivel the sheet.

15. The apparatus of claim 11 wherein said swiveling means swivels the first side back and forth across said sensing means.

16. In plotter apparatus adapted to receive a signal comprising a frame, means for transporting a sheet through said frame along a first axis, and means for marking the sheet moving through said frame in accordance with the signal received, the improvement comprising system for accurately aligning a sheet with a first linear side parallel to the first axis comprising:
(a) as said transporting means, a horizontally spaced pair of sheet transport means adapted to be disposed adjacent opposite sides of the sheet for independently transporting the sheet sides both forwardly and rearwardly, both with both of said transport means transporting the sheet sides in the same direction at the same rate to transport the sheet forwardly or rearwardly and with a first one of said transport means transporting the first side of the sheet at a lesser rate than a second one of said transport means transports the second side of the sheet to swivel the sheet;
(b) means spaced a given distance $X_1$ from said first transport means for sensing the first side of the sheet disposed adjacent said first transport means; and
(c) means for aligning the first side of the sheet with said sensing means comprising
  (i) means for aligning by use of said sensing means two points A and B narrowly spaced from each other by the distance $X_1$ along the first side of the sheet;
  (ii) means for then aligning by use of said sensing means a fourth point D widely spaced from point B by the distance $X_2$ along the first side of the sheet; and
  (iii) means for finally aligning by computation and without use of said sensing means a third point C intermedaite points B and D and narrowly spaced from point D by the distance $X_1$ along the first side of the sheet.

17. The apparatus of claim 16 wherein said means for aligning the first side of the sheet with said sensing means comprises:
  (i) means for swiveling the first point A on the first side of the sheet across said sensing means to locate the first side and align it substantially at the first point A with said sensing means;
  (ii) means for advancing the sheet the first given distance $X_1$; (iii) means for swiveling the second point B on the first side of the sheet across said sensing means to locate the first side and align it substantially at the second point B with said sensing means;
  (iv) means for advancing the sheet a second given distance $X_2$ substantially greater than the first given distance $X_1$;
  (v) means for swiveling the fourth point D on the first side of the sheet across said sensing means to locate the first side and align it substantially at the fourth point D with said sensing means by a net movement R of said second transport means, said first and second, second and third, and third and fourth points A and B, B and C, and C and D being spaced apart in the same direction the distances $X_1$, $X_2-X_1$ and $X_1$, respectively;
  (vi) means for advancing the sheet the first given distance $X_1$; and
  (vii) means for swiveling the third point C towards said sensing means by a net movement R' of said second transport means, where $R'=(R \times X_2)/(X_1+X_2)$.

18. The apparatus of claim 17 wherein each of said transport means comprises a rotatably friction drive, and the movements R and R' are rotational movements.

19. The apparatus of claim 17 wherein the first point A is spaced the given distance from said first transport means when the first point A is swiveled.

20. The apparatus of claim 17 wherein said first transport means retains a point on the first side of the sheet stationary while said second transport means transports the second side of the sheet to swivel the sheet about the point.

21. The apparatus of claim 16 wherein the first and fourth points A and D are held stationary by said first transport means as said second transport means swivels the second and third points B and C, respectively, across said sensing means, and said fourth point D is held stationary by said first transport means as said second transport means swivels the third point C towards said sensing means.

22. The apparatus of claim 17 wherein said transport means transports the first, third and fourth points A, C and D at a non-zero rate less than said second transport means transports the second side of the sheet to swivel the sheet.

23. The apparatus of claim 17 wherein the first and second points A and B are on opposite ends of a contemplated plot from said third and fourth points C and D.

24. The apparatus of claim 17 wherein the first and second points A and B are on opposite ends of a sheet from the third and fourth points C and D.

25. The apparatus of claim 17 wherein said swiveling means swivels the first side back and forth across said sensing means.

26. In plotter apparatus adapted to receive a signal comprising a frame, means for transporting a sheet through said frame along a first axis, and means for marking the sheet moving through said frame in accordance with the signal received, said marking means comprising
(a) a marker holder for holding a marker;
(b) storage means for holding a plurality of markers;
(c) means for causing said holder to receive a selected marker from and return it to said storage means; and
(d) means for moving said holder and any market held thereby along a second axis of the sheet substantially perpendicular to the first axis and along a third axis substantially perpendicular to the sheet;
the improvement comprising knife means for cutting the sheet along the second axis, said knife means being configured and dimensioned to be received, held and returned by said holder and held by said storage means as a marker.

27. The apparatus of claim 26 wherein said moving means comprises
(a) means for first moving said holder to position said knife means in the sheet to one side of a central segment of the sheet and then moving said holder outwardly along the second axis until it clears the sheet.
(b) means for next moving said holder to position said knife means in the sheet to the other side of the central segment of the sheet and then moving said holder outwardly along the second axis until it clears the sheet; and
(c) means for finally moving said holder along the second axis to cause said knife means to cut across the central segment of the sheet.

28. The apparatus of claim 26 wherein said moving means comprises means for moving said holder to cause said knife means to cut through the width of the sheet in a series of moves commencing centrally in the sheet and terminating beyond the edge of the sheet.

29. The apparatus of claim 26 additionally comprising means in said storage means and means in said holder for fixing the orientation of said knife means relative to said storage means and said holder.

30. In plotter apparatus adapted to receive a signal comprising a frame, means for transporting a sheet through said frame along a first axis, and means for marking the sheet moving through said frame in accordance with the signal received;
the improvement comprising means for collecting the segments cut from the sheet for storage comprising a bar member extending over at least the width of the sheet and movable in order among an initial retracted position wherein said bar member is disposed adjacent back surface of the sheet being transported and allows unimpeded fall of the sheet, an intermediate extended position wherein said bar member is disposed adjacent a front surface of the sheet being transported and allows unimpeded fall of the sheet, and a final retracted position wherein said bar member supports the segment of the sheet just transported after it has been cut.

31. The apparatus of claim 30 wherein said collecting means include spring members secured to said frame and adapted to bear on the segments supported by said bar member.

32. The apparatus of claim 30 wherein said bar member in said final retracted position grasps the front surface of the segment at substantially the mid-point thereof.

33. The apparatus of claim 32 additionally comprising means for moving said bar member from the initial retracted position to the intermediate extended position prior to transport of the segment of the sheet to the level of said bar member, and for moving said bar member from the intermediate extended position to the final retracted position when approximately half of the segment of the sheet has passsed the level of said bar member.

34. Plotter apparatus having the capability of unattended operation comprising:
(a) independently driven dual X-axis friction drives for transporting a sheet through the plotter;
(b) means for automatically aligning a sheet with the X-axis of the plotter;
(c) means for automatically cutting a sheet into segments along the Y-axis of the plotter; and
(d) means for automatically collecting and storing the segments.

35. A method for aligning a sheet with a first linear side parallel to its axis of transport through plotter apparatus comprising:
(a) swiveling a first point on the first side of the sheet across a single fixed sensing means to locate the first side and align it substantially at the first point with the sensing means;
(b) advancing the sheet a given distance; and
(c) swiveling a second point on the first side of the sheet across the sensing means to locate the first side and align it substantially at the second point with the sensing means, the first and second points being spaced apart the given distance.

36. A method for accurately aligning a sheet with a first linear side parallel to its axis of transport through plotter apparatus comprising the steps of:
(a) aligning by use of a sensing means first and second points A and B narrowly spaced from each other by the distance $X_1$ along a first side of the sheet;
(b) then aligning by use of the sensing means a fourth point D widely spaced from point B by the distance $X_2$ along the first side of the sheet; and (c) finally aligning by computation and without use of said sensing means a third point C intermediate points B and D and narrowly spaced from point D by the distance $X_1$ along the first side of the sheet.

37. The method of claim 36 comprising the steps of:
(a) swiveling a first point A on the first side of the sheet across sensing means to locate the first side and align it substantially at the first point A with the sensing means;
(b) advancing the sheet a first given distance $X_1$;
(c) swiveling a second point B on the first side of the sheet across the sensing means to locate the first side and align it substantially at the second point B with the sensing means;
(d) advancing the sheet a second given distance $X_2$ substantially greater than the first given distance $X_1$;
(e) swiveling a fourth point D on the first side of the sheet across the sensing means to locate the first side and align it substantially at the fourth point D with the sensing means by a net movement R of the transport means, said first and second, second and third, and third and fourth points A and B, B and C, and C and D being spaced apart in the same direction the distance $X_1$, $X_2-X_1$ and $X_1$. respectively;
(f) advancing the sheet the first given distance $X_1$; and
(g) swiveling the third point C towards the sensing means by a net movement R' of the transport means, where $R'=(R \times X_2)/(X_1+X_2)$.

38. The method of claim 37 wherein said sheet is swiveled by retaining a point on the first side of the sheet stationary while transporting the second side of the sheet to swivel the sheet about the point.

39. The method of claim 37 wherein said sheet is swiveled by transporting a point on the first side of the sheet at a non-zero rate less than the second side of the sheet.

40. The method of claim 36 wherein the sensing means is fixed in position and is the only sensing means used in the aligning method.

41. The method of claim 37 wherein the sensing means is fixed in position and is the only sensing means used in the aligning method.

* * * * *